United States Patent [19]
Cross

[11] Patent Number: 4,488,030
[45] Date of Patent: Dec. 11, 1984

[54] ELECTRICAL SPARK TREATMENT APPARATUS

[76] Inventor: James D. Cross, 41 Allen St. East, Waterloo, Ontario, Canada, N2J 1J1

[21] Appl. No.: 381,026

[22] Filed: May 24, 1982

[30] Foreign Application Priority Data

Oct. 14, 1981 [CA] Canada ................................. 387838

[51] Int. Cl.[3] .......................... B23P 1/06; H05B 7/18

[52] U.S. Cl. ...................................... 219/69 R; 83/15; 219/384; 315/231

[58] Field of Search ................. 219/384, 383, 68, 507, 219/69 P, 69 R, 69 C; 323/206; 83/16, 15; 131/281; 315/241, 242, 243, 228, 231; 455/317; 363/54, 57; 361/13

[56] References Cited

U.S. PATENT DOCUMENTS

| | | | |
|---|---|---|---|
| 1,922,984 | 8/1933 | Soundy | 315/244 |
| 2,543,730 | 2/1951 | Muchmore | 315/242 |
| 2,763,759 | 9/1956 | Mito et al. | 219/384 |
| 2,823,305 | 2/1958 | Aschermann | 455/317 |
| 2,895,080 | 7/1959 | Branker | 315/242 |
| 2,927,248 | 3/1960 | Ramsay | 315/243 |
| 2,933,599 | 4/1960 | Drybrough | 455/317 |
| 3,017,486 | 1/1962 | Kogan et al. | 219/383 |
| 3,158,728 | 11/1964 | Webb | 219/69 C |
| 3,162,800 | 12/1964 | Friedlander et al. | 323/206 |
| 3,380,008 | 4/1968 | Lunt et al. | 336/221 |
| 3,832,573 | 8/1974 | Ver Planck et al. | 363/57 |
| 3,842,342 | 10/1974 | Friedlander et al. | 323/206 |
| 3,985,997 | 10/1976 | Burley | 219/384 |
| 4,219,727 | 8/1980 | Bolt | 219/384 |
| 4,247,754 | 1/1981 | Baier | 219/384 |

FOREIGN PATENT DOCUMENTS

| | | | |
|---|---|---|---|
| 268472 | 2/1969 | Fed. Rep. of Germany | 219/69 C |
| 2355603 | 5/1974 | Fed. Rep. of Germany | 361/17 |
| 2523608 | 12/1976 | Fed. Rep. of Germany | 219/384 |
| 800033 | 8/1958 | United Kingdom | 219/69 C |
| 1167853 | 10/1966 | United Kingdom | 219/69 P |
| 348317 | 9/1972 | U.S.S.R. | 219/69 C |
| 576186 | 10/1977 | U.S.S.R. | 219/69 V |
| 707745 | 1/1980 | U.S.S.R. | 219/69 P |

OTHER PUBLICATIONS

"Radar Transmitters" (Ewell) McGraw-Hill pp. 104–105.

"High Speed Pulse Technology" (Frungel) Academic Press pp. 86–87.

*Primary Examiner*—C. L. Albritton
*Assistant Examiner*—Geoffrey S. Evans
*Attorney, Agent, or Firm*—Ridout & Maybee

[57] ABSTRACT

In electrical spark treatment apparatus, more consistent and controllable sparking from multiple spark gaps is achieved by providing individual energy storage components for each spark gap, including a capacitance and an inductance in series with each gap, and a path for charging current in parallel with each gap, and a common means for charging the capacitors and then discharging them to break down the spark gaps. A common damping means is associated with the switching device to absorb surplus energy released during discharge of the capacitors.

14 Claims, 1 Drawing Figure

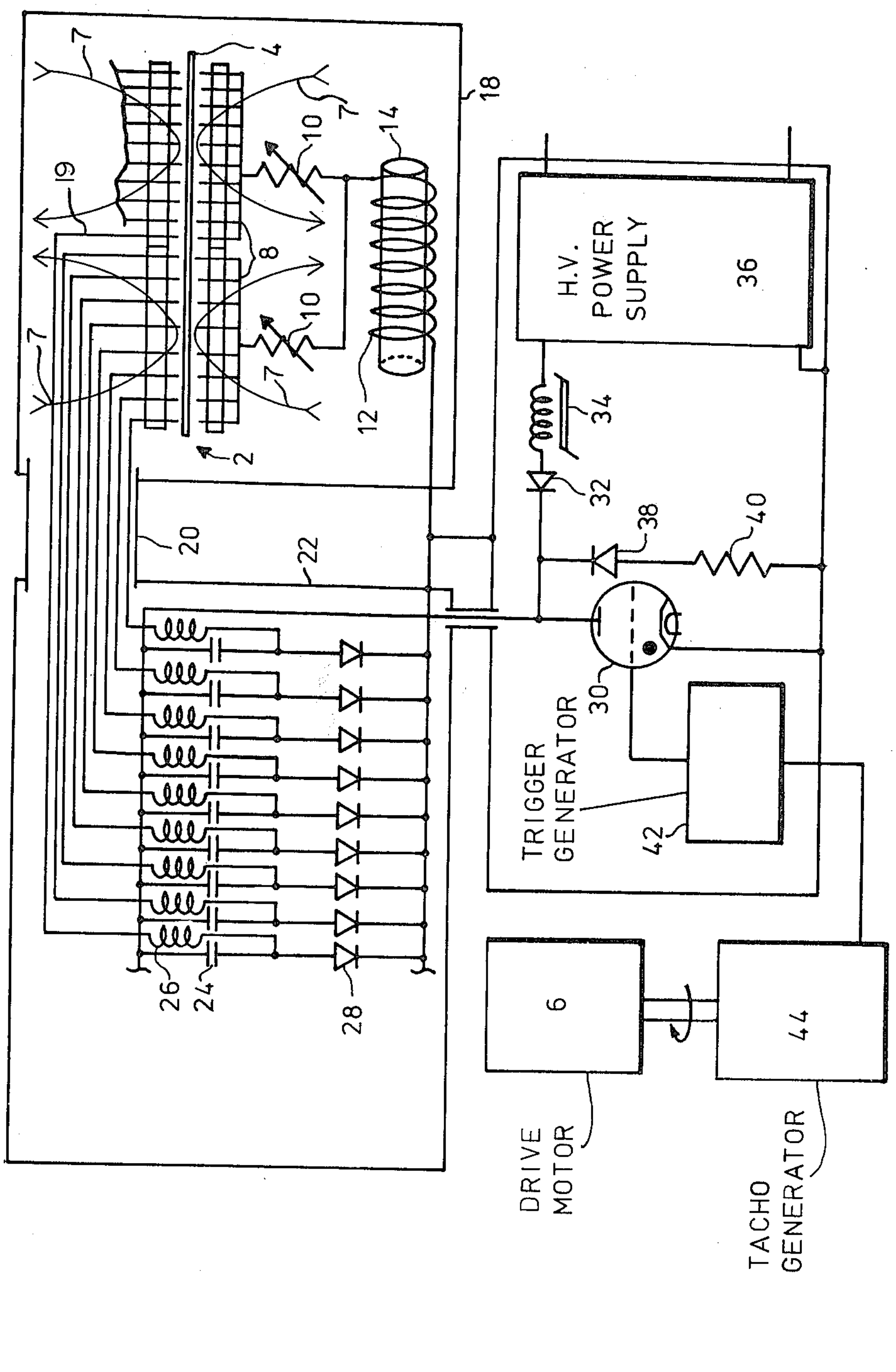
H.V.
POWER
SUPPLY
36
TRIGGER
GENERATOR
42
DRIVE
MOTOR
6
TACHO
GENERATOR
44

ELECTRICAL SPARK TREATMENT APPARATUS

This invention relates to the electrical spark treatment of workpieces using repeated sparks from arrays of electrodes. Although the invention should not be construed as limited to such an application, it will be described with reference to a primary application of spark treatment apparatus, namely the forming of multiple perforations in thin webs of materials.

Known apparatus of this type have generally used a high voltage generator driven by a high frequency oscillator to feed an array of electrodes. A fundamental problem with such apparatus is in obtaining a predictable division of spark energy between different electrodes in the array, since physical disparities, wear and variations in the web being treated will tend to mean that some electrodes will provide an easier discharge path than others. It is also difficult in such apparatus to maintain adequate control over the spark characteristics during the discharge. A further disadvantage of known apparatus is that it is not usually easy to control the spark repetition frequency over more than a limited range.

The object of the present apparatus is to provide means by which a high degree of control and uniformity in spark characteristics may be obtained and in which the spark repetition frequency may be readily varied over a wide range.

According to the invention, apparatus for the electrical spark treatment of materials comprises electrodes defining a plurality of spark gaps, each associated with an energy storage circuit comprising an inductance in series with each spark gap, a capacitor in series with each spark gap and its associated inductance, and a device connected in parallel with the spark gap to provide a path for current charging the capacitor, said energy storage circuits being connected in parallel with a common switching device closable at intervals to discharge the capacitors and a capacitor charging circuit operative to charge said capacitors between discharges to a potential sufficient to break down the associated spark gaps at each closure of the switching device.

This arrangement eliminates problems of spark current sharing by providing an independent energy storage circuit for each spark gap which whilst of simple construction enables ample scope for the tailoring of the spark characteristics to any particular application. The charging and switching circuits are common to all the energy storage circuits, thus avoiding expensive duplication, and moreover the use of the capacitor discharge technique for spark generation enables the spark repetition rate to be readily varied over a wide range without changing the spark characteristics. The switching device will normally be a controlled switch such as a thyratron or thyristor, the former generally being more practicable at the present time at the voltage and current ratings which will usually be required.

The device providing the return path for the spark gap current will usually be a diode although a resistor or a resistor and diode in series may be used depending on the spark characteristics desired. The switching device is preferably associated with electrical damping means to dissipate surplus energy released from the energy storage circuits following break down of the spark gaps. For this purpose, a lossy inductance may be connected in series with the switching device, such as the primary of an air cored transformer with a shorted turn secondary. This not only absorbs surplus energy, but helps slow down the switching transients and avoid radiation from the apparatus at radio frequencies. The inductance associated with the spark gap is also helpful in this respect, as well as providing temporary energy storage such as to prolong the spark discharge to a desired degree. The resistor or diode forming a return path for the spark gap current both enables this prolonged discharge and damps oscillations in the circuit.

Further features of the invention will be apparent from the appended claims and from the following description with reference to the accompanying drawing which is an electrical schematic diagram of an exemplary embodiment of apparatus in accordance with the invention.

Referring to the drawing, an array 2 of banks of electrodes forms a number of spark gaps spanning a path through which a web of material 4 may be moved by a transport system including a drive motor 6. Conveniently, the web may be supported for passage through the spark gaps by air streams 7 applied to its opposite faces, but it is to be understood that the means used to transport the web does not form part of the invention except to the extent that air used to support the web may also advantageously be used to cool certain portions of the apparatus of the invention as disclosed below. The electrodes to one side of the spark gaps are connected together in groups 8 and returned to ground through variable resistors 10 associated with each group and a lossy inductor 12 common to all the groups. The inductor 12 may conveniently be formed by placing a suitable winding on a copper tube 14, which acts as a shorted turn secondary of a transformer of which the winding provides the primary. These components and the electrode array are enclosed within a metallic housing 18 which provides both electrical and acoustic screening for the spark gaps.

The electrodes on the other side of the spark gaps are individually connected to suitably insulated wires 19 passing through a conduit 20 to energy storage circuits housed within a grounded metal enclosure 22 which is preferably oil filled to provide both cooling and insulation for the circuits it contains. Each energy storage circuit comprises a capacitor 24, an inductor 26 in series with the associated spark gap, and a diode 28 which provides a path for capacitor charging current and a return path for current passing through the inductor 26 and the spark gap to the junction of the capacitor 24 and the inductor. The other terminal of the capacitor 24 of each energy storage circuit is connected to a common line connected in turn to the anode of a thyratron 30 and also via a diode 32 and a saturable reactor 34 to the output of a high voltage direct current power supply 36. In order to damp reverse transients appearing across the thyratron during operation, a reverse connected diode 38 and a resistor 40 are connected between its anode and cathode. Trigger pulses are applied to the control grid of the thyratron from a suitable trigger generator 42 in response to signals from a tachometer generator 44 associated with the drive motor 6 of the web transport system.

In use, the capacitors 24 are charged by the power supply 36, the return path for the charging current being provided by the diodes 28. The charging voltage and the size of capacitors is selected according to the spark energy required, the material to be treated and the width of the spark gap. Thus for perforating paper, a typical application of the apparatus of the invention, a capacitance of 500–1000 pF may be used in combination with a charging potential in range 1.5–5 kV and a spark gap width of 0.5–3 mm, the parameters being adjusted according to the size of perforation required which will typically be in the range 2–100 microns. A 3 kv charging potential in conjunction with a 1 mm gap and capacitors having a 10 kv peak rating is typical. At an appropriate moment, the thyratron 30 is triggered by the trigger generator 42, thus effectively grounding the plates of the capacitors connected to its anode and causing the other plates to assume a high negative potential. This in turn causes the potential difference across the spark gaps to increase beyond their breakdown voltage, thus initiating spark discharges. The rate of change of current across the spark gaps is restricted by the inductors 26 (which also store some of the energy of the discharge), by the resistors 10 and by the inductor 12. The resistors 10 are of quite small value, typically no more than 10 ohms and are used merely to make slight adjustments to balance the characteristics of different bank of electrodes in the array to compensate for example for wear or other factors which may alter their performance. A substantial portion of the energy released is dissipated in the inductor 12, which may be formed for example by 200 turns of 10 gauge copper wire wound on a suitably insulated length of 7.5 cm diameter copper tube, and positioned so that it will be cooled by air from air streams used to support the web in its passage through the spark gaps.

When the capacitor 24 is discharged, the spark current will be maintained for a further period by the energy stored in the inductor 26. Inductance values of up to 10 mH are typical for this inductor, a value of 1–2 mH giving good results in the perforation of paper. The return path for this continued spark current is provided by the diode 28, which also serves to damp oscillation in the circuit. The functions of the diode may also be performed or complemented by a resistor, although if a resistor is used alone its value needs to be selected to allow it to pass sufficient current during charging and the later phases of discharging without passing too high a proportion of the current during the initial stages of the discharge. The build up of excessive reverse potential across the thyratron 30 after discharge of the capacitor is prevented by the damping circuit comprising the diode 38 and the resistor 40.

In order to prevent short circuiting of the power supply 36 during conduction of the thyratron 30, a saturable reactor 34 is placed in series with the supply which acts to block the current surges that would otherwise occur. A nonsaturating inductor could be used but would be less effective. The diode 32 protects the supply against high voltage transients generated in the remainder of the circuit. The power supply 36 itself may be conventional, comprising a transformer, rectifier and smoothing circuits. I have obtained satisfactory results using a thyratron having a voltage rating of 12 kV and a continuous current rating of 2 amps, and diodes of 12 kV and 1 amp continuous current rating for apparatus with up to 20 banks of electrodes each defining eight spark gaps, operated at a maximum cycle rate of 4000 sparks per sec. Operated at 3000 sparks per second and at 3 kV, the apparatus will form rows of perforations at approximately 1.5 mm intervals in paper moving at 300 metres per minute, with a power consumption of about 3 kilowatts. Smaller spacings of as little as 0.5 mm between perforations can be achieved, the limiting factor being the tendency for sparking to occur through previously formed adjacent perforations if the perforation spacing is too small.

Although the use of a thyratron has been described above, this could be replaced by a thyristor depending upon the availability of suitable devices. Moreover whilst an externally triggered device has been described, a self switching device could be used if a constant spark repetition frequency without external synchronization was satisfactory. In this case the power supply would need to be capable of charging the capacitors to a potential in excess of the break over voltage of the device, and a resistance would be required in the charging circuit to set its time constant.

The embodiments of the invention in which an exclusive property or privilege is claimed are defined as follows:

1. Apparatus for the electrical spark treatment of materials comprising pairs of electrodes defining a plurality of spark gaps, a corresponding plurality of inductors, each connected at one end to one electrode of one of said spark gaps, a corresponding plurality of capacitors each connected to the other end of one of said inductors, a corresponding plurality of devices each connected to a juncture of one of said capacitors and one of said inductors, each said device providing a path for current charging its associated capacitor which bypasses the associated spark gap and inductor, a common switching device closable at intervals and connected in parallel with the series circuits formed by said spark gaps, said inductors and said capacitors, and a common capacitor charging circuit operative to charge each of said capacitors between closures of said switching device to a potential sufficient to break down the associated spark gaps simultaneously upon closure of the switching device.

2. Apparatus according to claim 1, including electrical damping means associated with the switching device to damp oscillation of the series circuits following breakdown of their associated spark gaps.

3. Apparatus according to claim 2, wherein the electrical damping means comprise a lossy inductance in series with the switching device.

4. Apparatus according to claim 3, wherein the lossy inductance is the primary of a transformer with a shorted turn secondary.

5. Apparatus according to claim 4, wherein the transformer primary is a coil wound on a tubular copper core forming the secondary.

6. Apparatus according to claim 2, wherein the electrical damping means comprise a damping resistor in parallel with the switching device, a diode being connected in series with the resistor to prevent unwanted discharge of the capacitors.

7. Apparatus according to claim 1, wherein each device providing a path for charging current is a diode connected across the associated spark gap and its associated inductor.

8. Apparatus according to claim 1, wherein the switching device is a thyratron.

9. Apparatus according to claim 1, wherein the capacitor charging circuit is connected to the capacitors through a device limiting current flow from the charging circuit during discharge of the capacitors.

10. Apparatus according to claim 9, wherein the current limiting device is an inductor.

11. Apparatus according to claim 10, wherein the current limiting device is a saturable reactor.

12. Apparatus according to claim 1, wherein the spark gaps are divided into a number of groups, and an adjustable resistor is connected in series with each group to permit balancing of the spark characteristics of each group.

13. Apparatus according to claim 1, in which the material being treated is a web material, the apparatus includes means to transport the material through the spark gaps, and the switching means is controlled by an external signal, including means to generate control signals applied to the switching means at a frequency proportional to the rate of transportation of the material.

14. Apparatus according to claim 3, wherein the material being treated is a web material which is transported through the spark gaps by air streams, and air from the air streams is utilized to cool the electrical damping means and the electrodes.

* * * * *